United States Patent [19]

Sullivan

[11] 4,440,539

[45] Apr. 3, 1984

[54] METHOD AND APPARATUS FOR CONVEYING PARTICULATE MATTER

[76] Inventor: Thomas J. Sullivan, P.O. Box 5119, 220 Nesbitt St., Poland, Ohio 44514

[21] Appl. No.: 344,367

[22] Filed: Feb. 1, 1982

[51] Int. Cl.³ .............................................. B65G 65/32
[52] U.S. Cl. .................................... 414/300; 414/299; 198/583
[58] Field of Search ........................ 414/293, 299, 300; 198/318, 319, 320, 583, 666, 667, 584, 303

[56] References Cited

U.S. PATENT DOCUMENTS

| | | | |
|---|---|---|---|
| 985,392 | 2/1911 | Card et al. | 414/300 |
| 1,479,378 | 1/1924 | Davis | 198/583 X |
| 3,337,068 | 8/1967 | Meharry | 198/666 X |
| 3,446,371 | 5/1969 | Nicolas | 414/300 |
| 4,142,621 | 3/1979 | Oliver | 198/666 X |
| 4,368,003 | 1/1983 | MacDonald | 198/666 X |

*Primary Examiner*—Joseph E. Valenza
*Assistant Examiner*—Ken Muncy

*Attorney, Agent, or Firm*—Thomas H. Murray; Clifford A. Poff

[57] ABSTRACT

To convey particulate materials such as grain to a top central cavity of a large container such as an on-farm silo or bin, there are provided a first auger-containing flexible roof-mounted conveyer section having on its receiving end a guide, a cooperating ground-adjacent auger-containing conveying section, keys and dogs on the augers cause the auger in the second section to drive the auger in the first section, and hooks and pins for securing the two sections together. Preferably, the apparatus further includes carriage for the ground-adjacent conveyor section. By making the roof-mounted section of suitable length to accommodate the geometry of the silo or bin, any of a great variety of bin geometries may be accommodated with the use of a single standard length of ground-adjacent conveyor section, which affords considerable economies to the manufacturers, distributors, and users of such equipment.

10 Claims, 8 Drawing Figures

METHOD AND APPARATUS FOR CONVEYING PARTICULATE MATTER

BACKGROUND OF THE INVENTION

1. Field of the Invention

This invention relates to a method and apparatus to convey particulate material from a location of lower elevation, such as ground level, to a relatively less accessible location of higher elevation, such as the top of a bin, vat, silo or other container, particularly on-farm storage silos.

2. Description of the Prior Art

The on-farm grain bins or silos now in common use vary in diameter from about 15 feet to 36 feet and in height from about 18 feet to 36 feet. The known feed-auger equipment for conveying grain from ground level to the loading apertures of such bins accordingly varies considerably in length, ranging from about 28 feet to about 72 feet.

In accordance with methods, practice and equipment known prior to the present invention, feed-auger equipment for the purpose indicated above has customarily been made in such a way that there are provided (a) an integral transport auger which is of one or another of some suitable number (5 to 9) of predetermined lengths, plus (b) the other equipment which is needed with an auger of that length. In other words, if there are in a manufacturer's line of transport-auger equipment eight different lengths of auger, then there are also eight different lengths of tubes, eight different auger screws, eight different drive kits, undercarriages, truss kits, etc. for each of the several different diameter augers. There is a very substantial drawback to the practice of continuing to attempt to meet the requirements of the farmers by means of having five to nine different standard lengths of transport auger, each of which has its own set of concomitant equipment. This is very costly to manufacturers and distributors of such equipment, and ultimately to the farmers and their customers. The use of a standard length auger to load grain into a particular bin or silo is based on a particular elevation of ground level which changes because of ruts, etc. This requires a re-establishment of the original ground elevation from time to time before the auger can be used.

For his part, a manufacturer requires different engineering, tooling, dies, packaging, etc., for each size of a component which performs a given function. Moreover, the manufacturer faces additional costs and expenses in connection with shipping, since each load tends to be different.

A distributor likewise faces problems. To ensure a sale, he must carry a complete line of the different sizes, and to meet his service problems, he requires a relatively large inventory of parts.

Concerning what has been known from previous patents and other references about auger equipment, it is known (e.g., from U.S. Pat. No. 3,337,068 or U.S. Pat. No. 3,719,268) that an auger encased in a tube and used for conveying particulate material can be made in two sections, with a mechanical connection such that rotary motion imparted to an auger in one of the sections is transmitted to the auger in the other.

From U.S. Pat. No. 4,142,621, there is known an auger elevator structure which comprises a mobile support, a ground-unit drivable encased-auger conveyor section so mounted upon the mobile support that its angle or attitude with respect to the ground may be adjusted, and additional conveyor sections that can be added to obtain a desired length within limits of maintaining an acceptable balance and stability. To the extent that it is possible to overcome various ones of the drawbacks mentioned above with the use of equipment which does not involve the use of anything mounted upon the silo or bin roof, the structure taught in the above-mentioned patent may suffice. As those skilled in the art will appreciate, however, the equipment of the kind described in U.S. Pat. No. 4,142,621 is necessarily somewhat limited in respect to the overall lengths and the conveying capacities which can feasibly be obtained without having a structure which becomes top-heavy. Those skilled in the art have not found in this patent any satisfactory solution to the problems of a farmer who owns a number of different bins or silos having different overall dimensions within the range indicated above and desires to load them at rates of conveying which are on the order of those that are usual with prior-art transport-auger equipment of the kind that is commercially available. Sometimes more than one feed auger is needed for utility use on the farm.

From the point of view of the farmer, the transport-auger equipment which has been commercially available prior to the present invention has also been disadvantageous in various respects other than those specifically discussed above. An auger of a given length is usually (for any silo of desirably large size) too long and awkward to be stored conveniently within existing farm buildings, and this means that any long auger is subject to wind damage, for example, by being crimped or blown over. Moreover, although it is frequently economically desirable to use a larger bin or silo, there has repeatedly been the problem that this would make the farmer's existing long auger obsolate; a relatively expensive new one would need to be purchased. Keeping several different ones, each for use with loading of trucks, wagons and loading and unloading of bins or silos of the size or sizes handled thereby, has obvious disadvantages in terms of the investment required and the space occupied by the equipment when it is not in use. There has been, from the farmer's point of view, a distinct need for equipment which is both conveniently storable and adequately versatile in respect to handling the conveying of grains to large bins or silos of different sizes and shapes.

SUMMARY OF THE INVENTION

The present invention provides a method and apparatus to convey particulate materials such as grain to the top central cavity of a plurality of large containers such as on-farm silos or bins by providing and employing a first auger-containing conveyor on the roof of each container, each first conveyor including one or more conveyor sections normally supported by the container roof to remain therewith, each first conveyor having guide means on its material-receiving end, a ground-adjacent auger-containing conveyor section adapted to cooperate with any selected one of the first conveyor sections, means for causing the auger in the second conveyor section to drive the auger in a selected one of the first conveyor sections, and means for retaining a first conveyor section and the second conveyor section together. Preferably, the present invention further provides a carriage means and the use thereof for supporting and moving the ground-adjacent conveyor section from container to container. The first conveyor section which is roof mounted on a container has a length which is selected from a single conveyor section or a combination of conveyor sections to accommodate the geometry of a silo or bin so that any of a great variety of bin geometries may be accommodated for use with a single standard length of a ground-adjacent conveyor section. The apparatus and method for conveying particulate material to bins or silos offer considerable economy to the manufacturers, distributors, and the users.

DESCRIPTION OF THE DRAWINGS

A complete understanding of the present invention can be obtained from the foregoing and following description thereof, taken in conjunction with the appended drawings, in which:

FIG. 4 is a detailed elevational view similar to FIG. 3, but illustrating a further embodiment of the support structure;

DESCRIPTION OF THE PREFERRED EMBODIMENTS

Figure 1:
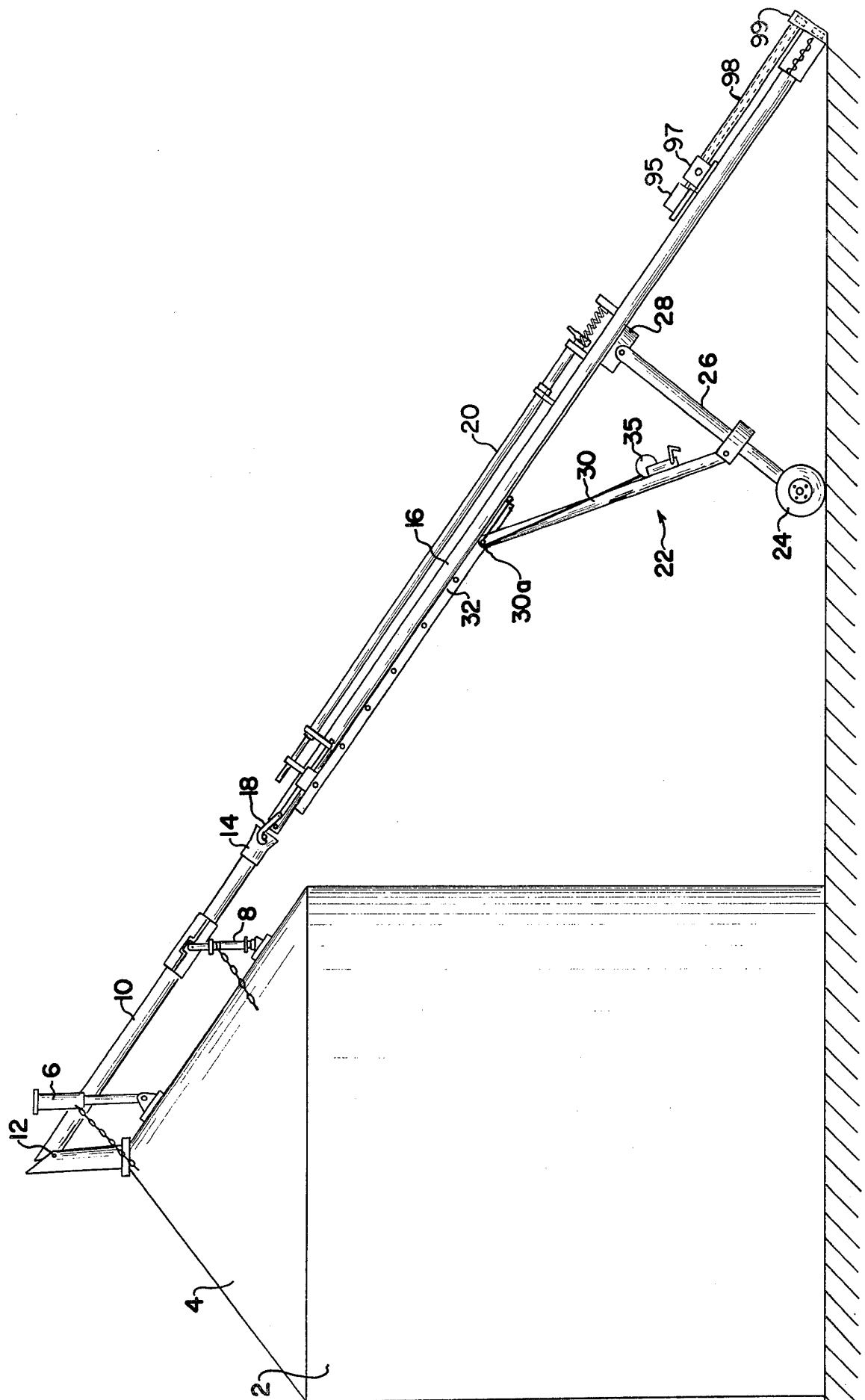
FIG. 1 is an overall elevational view of apparatus for conveying particulate material in accordance with the present invention.

In FIG. 1, there is indicated a silo or bin 2 having a roof portion 4, upon which there are provided a chain sling support 6 and a flexible support 8 for an enclosed-auger conveyor section 10. Near the delivery end of the section 10, there is preferably a pivot pin 12 for connecting the delivery end of the section 10 to a flexible conduit 34 for conveying the particulate material to the top central opening 38 of the bin or silo 2. The particulate material may be directed to opening 38 from conveyor 10 by other well known devices. The section 10 has at a receiving end thereof a generally funnel-shaped guide means 14 for receiving the delivery end of a ground-adjacent enclosed-auger section 16. There may also be seen in FIG. 1 a hook means 18 for securing together the two sections 10 and 16, as well as a shaft 20, which is used in a manner explained below to latch or unlatch the hook means 18. The lower section 16 is mounted on a carriage generally indicated at 22, comprising tires 24, an undercarriage arm comprised of bracket 26 secured to a plate 28 on the underside of section 16, and a lever link 30 which is secured to a bracket 32 having perforations therein which permit adjustment in the attitude or angle of the section 16 with respect to the horizontal. A conventional hand winch 35 is mounted on link 30. A winch cable is attached at its free end to the rear part of bracket 32 after it is passed about pulley 30A on link 30.

Figure 2:
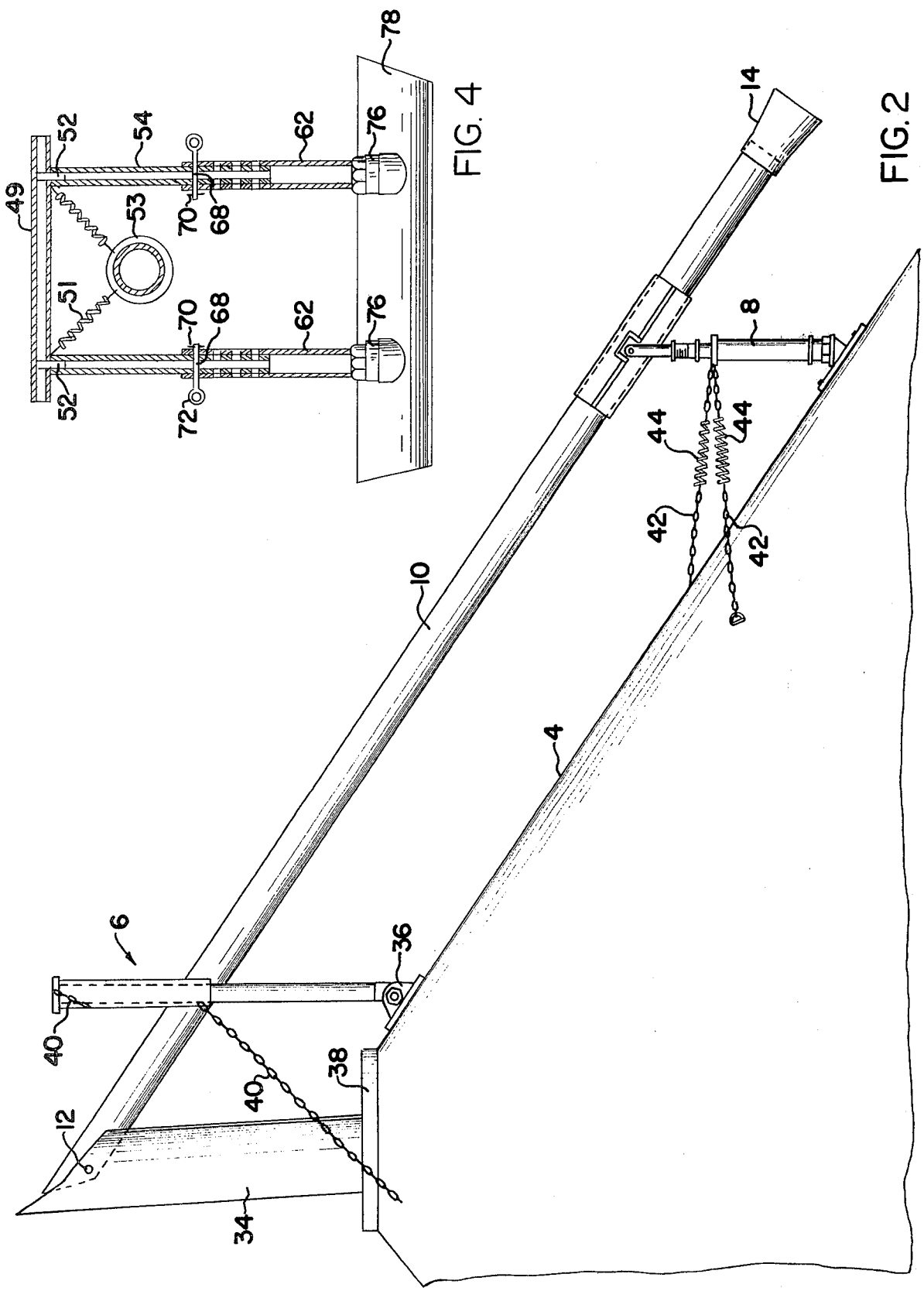
FIG. 2 is a detailed elevational view of the roof-mounted auger portion of the apparatus shown in FIG. 1.

Referring now to FIG. 2, there is indicated in somewhat greater detail the chain sling support 6, which is secured as indicated to a bracket 36 located on the roof portion 4, and preferably at a location as close to the bin center opening 38 as possible. It is preferred, but not essential, to support the bracket by a pivot on a support plate which is covered by the roof 4. A number of chains 40, as required, secures the support 6 to the auger to the conveyor section 10. Also shown in FIG. 2 is a flexible support 8, further details of one embodiment appear in FIG. 3. The flexible support 8 is secured to the roof portion 4 by means of two chains 42 containing tension-spring 44.

Figure 3:
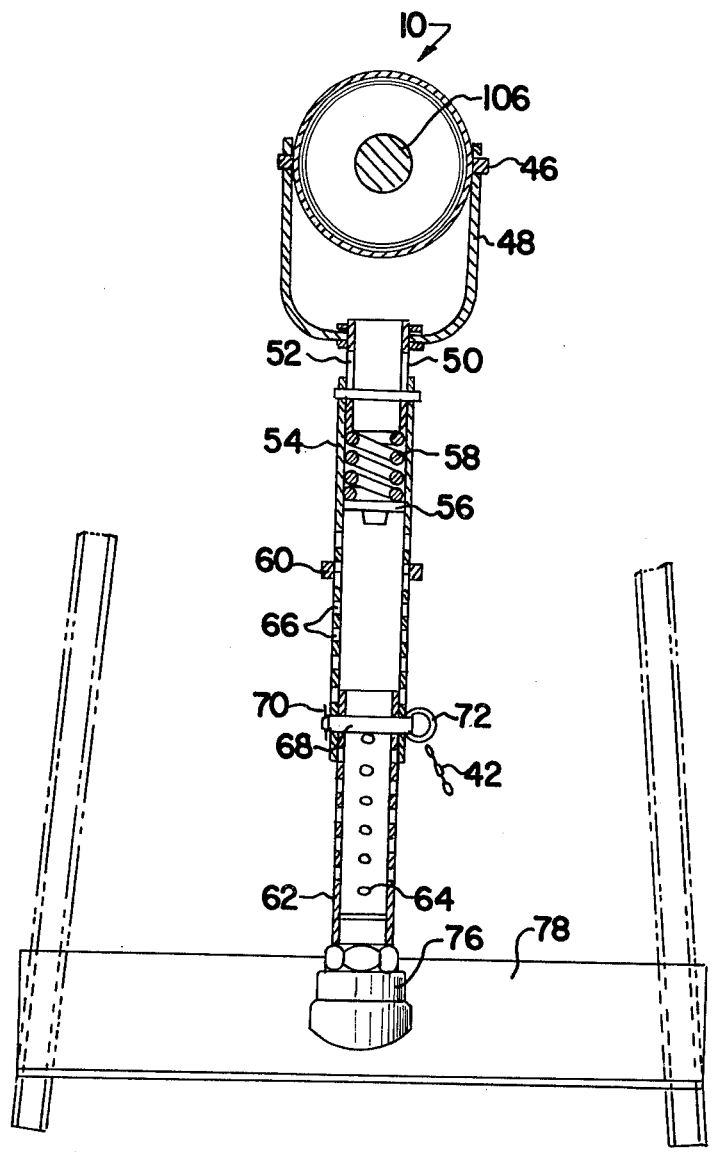
FIG. 3 is a detailed elevational view of a support structure for a portion of the auger section shown in FIG. 2.

In FIG. 3, the flexible support 8 is shown in section for the roof-mounted enclosed-auger section 10, which is trunnion-mounted as at 46 to a bracket 48 having a swivel connection as at 50 to a tubular member 52. The tubular member 52 has a sliding connection with tubular member 54, within which are located an adjusting nut 56 and a compression spring 58 which determine the elevation of the trunnion mounting 46. The tubular member 54 is provided with a collar 60 having associated therewith a setscrew (not shown). The tubular member 54 has sliding contact with yet another tubular member 62 containing a number of perforations 64 which cooperates with perforations 66 in tubular member 54 and a pin 68 which may be held by means of a suitable cotter pin 70, to aid in positioning the section 10 at a desired elevation in the vicinity of the trunnion mounting 46. At the end of the pin 68 opposite the cotter pin 70, there are provided rings 72 having attachment to the above-mentioned chains 42.

The tubular member 62 has connection by means of a ball-and-socket joint indicated at 76 to the platform supported by the roof 4.

In FIG. 4, a further embodiment of flexible support 8 is shown in section for the roof-mounted enclosed-auger section 10. In FIG. 4, the parts which are the same as the parts already described in regard to FIG. 3 bear the same reference numbers. The upstanding support assemblies each comprising a tubular member 52 connected with a tubular member 54 in sliding contact with tubular member 62. A pin 68 is held in place by a cotter pin 70. Removal of pin 68 permits tubular member 54 to be raised or lowered for selecting a desired elevation for a crosshead 49 interconnecting upper ends of tubular members 52. Tension springs 51 extend from an end portion of the crosshead to a support collar 53 for supporting the lower end portion of the auger section 10. Tension springs permit lateral and vertical shifting of the lower part of the auger to facilitate engagement of the auger section 10 with the funnel-shaped guide means 14 of the auger section 10. While not shown in FIG. 4, it is to be understood that the chain 42 and tension spring 44 therein are provided to support each of the upstanding columns for their limited pivotal movement by means of ball and socket joints 76 on platform 78.

Figure 5:
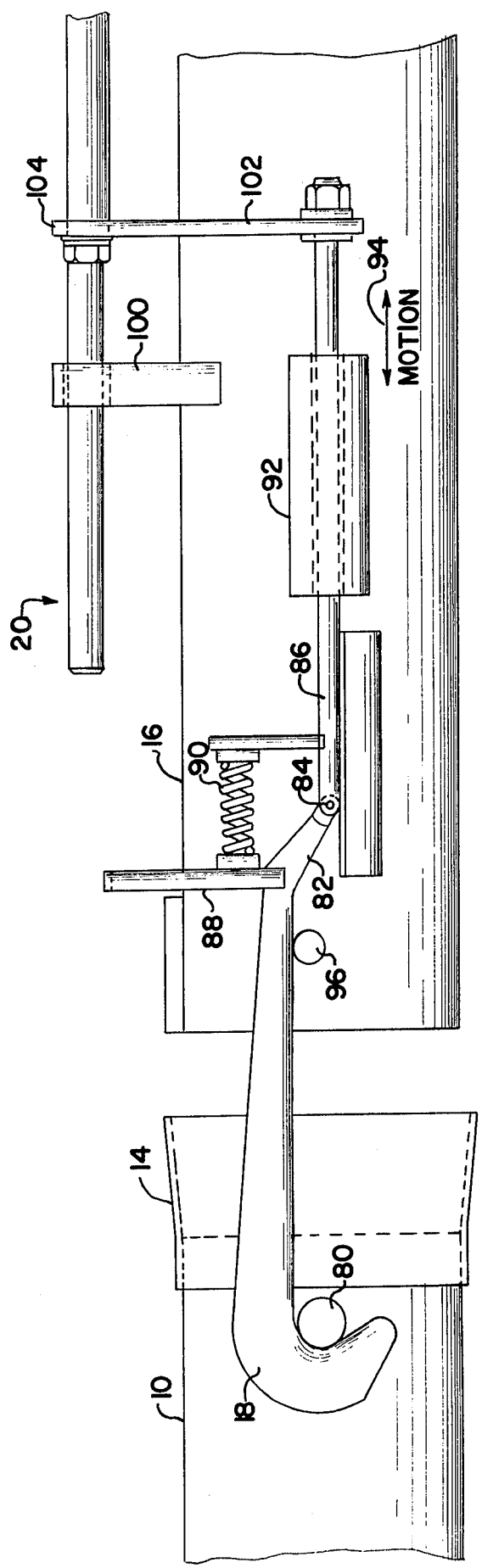
FIG. 5 is still another detailed elevational view, particularly showing how the roof-mounted auger section is secured to the ground-adjacent auger section in one embodiment of apparatus according to the present invention.
Figure 6:
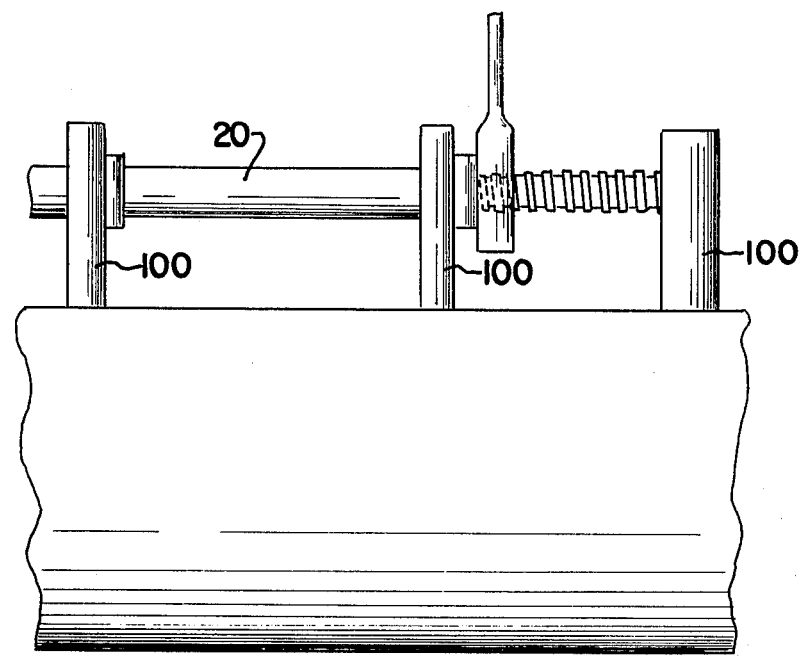
FIG. 6 is a detailed elevational view of a portion of a lower end of the ground-adjacent auger section.

As shown in FIG. 5, the section 10 is provided with pins 80 which cooperate with the hook members 18 in a manner to be described to secure together the sections 10 and 16 at diametrically opposite sides. Hook member 18 at each side of section 16 contains a foot portion 82 having at its lower extremity a pivotal connection as at 84 to a guide rod 86. The hook member 18 contains an arm 88, against which there bears a spring 90. A guiderod assembly 92 holds the rod 86 for motion towards or away from the section 10, as indicated by the arrow 94. Also on the exterior of the section 16, there is a cam-lift actuator 96, such that when the guide rod 86 is moved to the left, the hook member 18 is raised out of contact with the pin 80.

The shaft 20 is journaled for rotating movement, alone or with translation movement, with respect to a number of supports 100.

Those skilled in the art will appreciate that there are various schemes which may be employed, such that rotation of the shaft 20 causes motion of the guide rod 86 as indicated by the arrow 94. In accordance with one such scheme, as pictured, a rotation of the shaft 20 causes translation of the shaft along its longitudinal axis, and this motion is transmitted by the lever arm 102 to the guide rod 86. In one obvious alternative, the arm 102 has connection with the shaft by means of an internally threaded connection which cooperates with external threads on the shaft 20, so that rotation of shaft 20, without translation, causes motion of the lever arm 102 to the left or to the right as seen in FIG. 5, and this causes corresponding motion of the guide rod 86.

Figure 7:
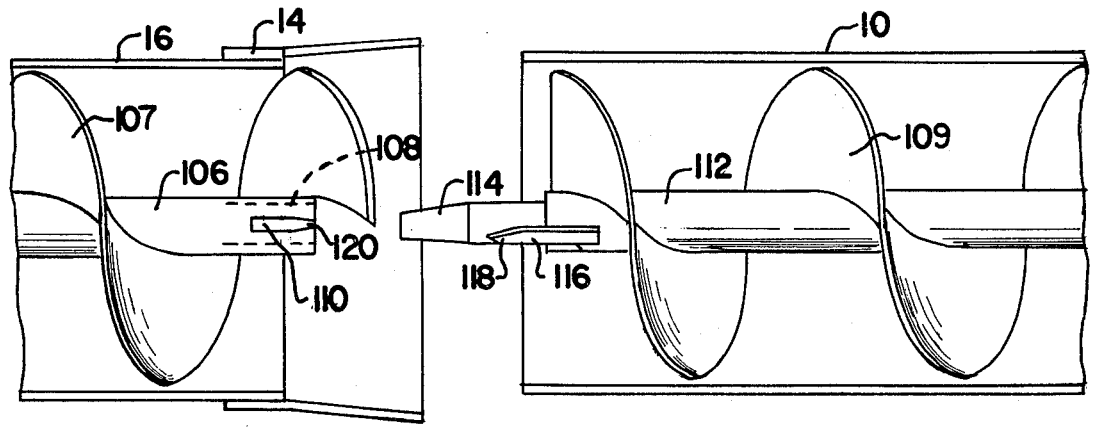
FIG. 7 is a detailed view, with parts broken away, showing the manner of causing an auger in the ground-adjacent unit to transmit rotary motion to an auger in the roof-mounted unit.

As shown in FIG. 1, the augers in sections 10 and 16 are driven by a motor 95 coupled to a gear reducer 97 which is supported on the lower exterior of section 16. A drive shaft is protectively housed in a tube 98 which extends from the reducer 97 to a drive housing 99 at the end of section 16. In the drive housing 99 there are two sprockets joined together by a drive belt; one sprocket is on the end of the drive shaft and the other sprocket is on the end of the auger in section 16. While a motor is shown for driving the auger, it is to be understood that a gas engine, the power to be of a traction or other form of drive, can be used without departing from the spirit of the invention. The manner in which rotary motion imparted to the auger enclosed in section 10 is transmitted to the auger enclosed in section 16 will be disclosed below in connection with FIG. 7. On the shaft 106 of the enclosed auger in section 16, there are a number of flights 107 of a spiral conveyor, and similar flights 109 are provided on the shaft 112 of the auger enclosed in section 10. As indicated at 108, the shaft 106 is hollow at the receiving end of the section 10, to permit the receipt of the end 114 of the shaft 112. The end 114 is preferably, as shown, tapered to fit within the opening 108 at the end of the shaft 106. Secured to the exterior of the shaft 106 is a key 110, preferably one having a pointed end as at 120.

Secured to the exterior of the shaft 112 is a driving dog 116 preferably having a pointed end 118. The ends are pointed to avoid the development of difficulties in fitting the two shafts 106 and 112 together, except in the unlikely event that the points 120 and 118 coincide. As necessary, there may be provided a void gap in one or more of the flights 107 affixed to the shaft 106.

Figure 8:
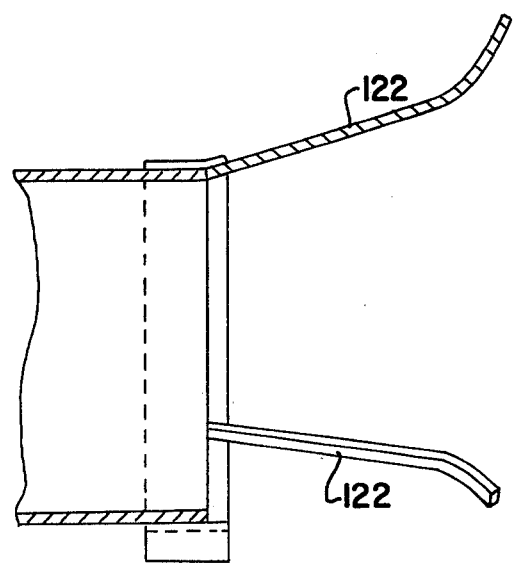
FIG. 8 is still another detailed view, showing an alternative form of guide means for guiding the ground-adjacent auger section into contact and alignment with the roof-mounted transport auger section.

In FIG. 8, there is shown an alternative arrangement to be used in place of the funnel-shaped guide member 14, in accordance with which there is provided a number of outwardly flared arms 122. Preferably, there are three arms, spaced 120 degrees apart.

Extensive calculations have been conducted which reveal that with a structure of a kind indicated above, with the use of a lower section 16 having a length of approximately 32 to 36 feet, together with roof-mounted portions 10 having one or another of approximately seven of less standard lengths, it is possible with equipment of the kind generally indicated above to accommodate the feeding of any of a very great variety of bins or silos having different diameters and/or heights, without departing from the use of a satisfactory angle of elevation for the sections 10 and 16, i.e., the angle which they form with the horizontal when they are in use. Such angle ranges from 25 to 45 degrees in a typical example. Thus, with equipment according to the invention as described above, there may be obtained the various economies indicated above. The roof auger section 10 may be comprised of a plurality of auger sections although a single auger section 10 can be used without departing from the spirit of the present invention.

Those skilled in the art will appreciate that as there are variations in the angle between the horizontal and the sections 10 and 16, there are corresponding variations in such important things as (a) the overall length of the conveyor sections 10 and 16, (b) the weight of particulate matter of a given density which is to be found within a given unit length of one or the other of the conveyor sections 10 and 16, and (c) throughput of the apparatus for a given rotational speed of the augers contained in the sections 10 and 16. Smaller or lower angles with respect to the horizontal are associated with (a) greater overall length, (b) greater conveyor weights of particulate matter can be conveyed per unit length, and (c) greater throughput at a given rotational speed of the augers. At a given power rating for the motor driving the auger to the section 16, there is more throughput when the above-mentioned angle is lower rather than higher. In other words, the less angle to the horizontal the better. The present invention permits one to add a section to a roof auger to reduce the angle with the horizontal. Those skilled in the art will be able to design appropriate equipment for meeting the requirements of a particular case in view of the foregoing considerations.

The extensive calculations mentioned above may be summarized in the following Table, which demonstrates the versatility of equipment of the kind according to the invention when the section 16 has an overall length of approximately 34 feet.

TABLE

| Bin Diam., ft. | Bin Ht., ft. | Eave Ht., ft. | Length of Sec. 16, ft. | Length of Sec. 10, ft. | Angle, degrees |
|---|---|---|---|---|---|
| 33 | 33.33 | 24.00 | 34 | 24 | 45 |
| 33 | 22.67 | 13.33 | 34 | 22 | 29 |
| 18 | 21.17 | 16.00 | 34 | none | 45 |
| 18 | 29.17 | 24.00 | 34 | 17 | 45 |
| 18 | 26.50 | 21.33 | 34 | 15 | 40 |
| 21 | 30.17 | 24.00 | 34 | 20 | 42 |
| 21 | 19.50 | 13.33 | 34 | 12 | 29 |
| 24 | 30.92 | 24.00 | 34 | 20 | 45 |
| 24 | 20.25 | 13.33 | 34 | 15 | 28 |
| 27 | 31.83 | 24.00 | 34 | 22 | 45 |
| 27 | 21.17 | 13.33 | 34 | 17 | 29 |
| 30 | 32.75 | 24.00 | 34 | 24 | 45 |
| 30 | 22.08 | 13.33 | 34 | 17 | 30 |
| 36 | 34.17 | 24.00 | 34 | 29 | 45 |
| 36 | 31.50 | 21.33 | 34 | 24 | 44 |
| 36 | 28.83 | 18.67 | 34 | 24 | 36 |
| 36 | 26.17 | 16.00 | 34 | 22 | 33 |
| 36 | 23.50 | 13.33 | 34 | 22 | 32 |
| 36 | 20.83 | 10.67 | 34 | 20 | 25 |

Although the invention has been shown and described in connection with a certain specific embodiment, it will be readily apparent to those skilled in the art that various changes in form and arrangement of parts may be made to suit requirements without department from the spirit and scope of the invention.

I claim as my invention:

1. Apparatus for conveying particulate material from a lower elevation to a location of higher elevation, said location being situated substantially centrally with respect to the roof of a container of substantial dimension, said apparatus comprising, in combination, a first enclosed-auger section having a receiving end and a delivery end, means for mounting said first section upon said roof, means for aligning the discharge end of a second enclosed-auger section with said receiving end of said first section, a portable second enclosed-auger section of substantial length, said second section having a feed end and a delivery end, means for releasably securing said delivery end of said second enclosed-auger section to said first section, and drive means for the auger in said second section, the second auger section having a drive-transfer means for driving the auger in said first section.

2. Apparatus as defined in claim 1, wherein said means for mounting said first section upon said roof flexibly supports said first section.

3. Apparatus as defined in claim 2, wherein said apparatus further includes carriage means for mounting said second section.

4. Apparatus as defined in claim 1, wherein said apparatus further includes carriage means for mounting said second section.

5. The apparatus according to claim 1 wherein said means for releasably securing includes two members for grasping opposite sides of one of said first and second enclosed-auger sections.

6. The apparatus according to claim 5 wherein said means for releasably securing further includes means for moving said two members.

7. A method for conveying particulate material from a location of lower elevation to a plurality of relatively less accessible locations of higher elevation associated with roofs of containers having different geometries, said method comprising the steps of:

providing a portable carriage-mounted enclosed-auger section having means for securing a discharge end thereof into a cooperating engagement with a roof-mounted enclosed-auger section, aligning the discharge end of the carriage-mounted enclosed-auger section with said first roof-mounted enclosed-auger section, releasably securing said carriage-mounted enclosed-auger section to said first roof-mounted enclosed-auger section having a feed end operatively connected to said carriage-mounted enclosed-auger section, a delivery end adjacent an opening in the roof of a first of said containers upon which it is mounted, an auger therein which is drivenly connected by a drive-transfer means to the auger in said carriage-mounted enclosed-auger section, and a length suited to the geometry of the vessel upon which it is mounted, driving the auger in said carriage-mounted enclosed-auger section while connected by a drive-transfer means to drive the auger in said first roof-mounted enclosed-auger section, conveying particulate material through said carriage-mounted enclosed-auger section and said first roof-mounted enclosed-auger section, disconnecting said carriage-mounted enclosed-auger section from said first roof-mounted enclosed-auger section, releasably connecting said carriage-mounted enclosed-auger section to a second roof-mounted enclosed-auger section, on a second of said containers, said second roof-mounted enclosed-auger section having a feed end operatively connected to said carriage-mounted enclosed-auger section, a delivery end adjacent an opening in the roof of the container upon which it is mounted, and an enclosed auger drivenly connected by a drive-transfer means to the auger in said carriage-mounted enclosed-auger section, and a length suited to the geometry of the vessel upon which it is mounted, driving the auger in said carriage-mounted enclosed-auger section while connected by a drive-transfer means to drive the auger in said second roof-mounted enclosed-auger section, and conveying particulate material from a feed end of said carriage-mounted enclosed-auger section to said opening in the second of said containers through said carriage-mounted enclosed-auger section and said second roof-mounted enclosed-auger section.

8. A method as defined in claim 7, wherein said carriage mounted section is brought into substantially collinear relationship first with said first roof mounted section and then with said second roof mounted section, said sections forming with the horizontal an angle of 25 to 45 degrees.

9. A method of delivering particulate material to top central openings in a plurality of containers having diverse geometries, each of said containers having a roof having mounted thereon an enclosed-auger section having at a feed end thereof a guide means, said method comprising successively releasably attaching a portable carriage-mounted enclosed-auger section having a driven auger end having a length sufficient to engage the feed ends of each roof-mounted enclosed-auger section, driving said roof-mounted enclosed-auger section on successive ones of said containers through a drive transfer means by the driven auger in said carriage-mounted enclosed-auger section and, while said sections are so connected, delivering particulate material to said opening through said sections.

10. A method as defined in claim 9, wherein said sections, when connected, are in substantially collinear relationship and form with the horizontal an angle of 25 to 45 degrees.

* * * * *